ADD-ON COOLING SYSTEM

Filed June 23, 1966

INVENTORS
Thomas N. Urquhart,
Michael A. Koltuniak
BY
Harness, Dickey & Pierce
ATTORNEYS United States Patent Office 3,396,780 Patented Aug. 13, 1968

3,396,780

ADD-ON COOLING SYSTEM

Michael A. Koltuniak, Warren, and Thomas N. Urquhart, Troy, Mich., assignors to The Udylite Corporation, Warren, Mich., a corporation of Delaware Filed June 23, 1966, Ser. No. 560,006
8 Claims. (Cl. 165—47)

ABSTRACT OF THE DISCLOSURE

A cooling system for a rectifier assembly including a main cooling apparatus for directing the flow of a cooling fluid across the heat generating electrical components by the the electrical apparatus and an auxiliary cooling unit removably connected to the main housing.

The purpose of the foregoing abstract is to enable the Patent Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

*Background and summary of the invention*

The present invention broadly relates to electrical power supply apparatuses and more particularly to an improved system for cooling the electrical components of a power supply system mounted within an enclosure. More specifically, the present invention is applicable to an improved rectifier apparatus for supplying direct current electrical energy to a load wherein the rectifier apparatus is incorporated within an enclosure which may be provided with an auxiliary cooling unit removably connected thereto. The auxiliary unit is utilized to effect sealing of the enclosure from the external environment and also provide an additional heat dissipating facility for removing heat from the electrical components.

A variety of electrical power apparatuses are in wide commercial use wherein various types of cooling systems are provided to dissipate the heat generated by the electrical components contained therein. Cooling of the electrical components within the enclosure is necessary to provide long operating life for the components and to operate the system at optimum efficiency. Certain systems are provided wherein the electrical components are cooled by means of air drawn from within or outside of the building in which the system is being utilized. The air is then directed over the electrical components by means of a blowing apparatus, as is common in the art. While such open, air-cooled systems are adequate for certain applications, units are being installed in environments containing corrosive atmospheres and wherein the air is contaminated with dirt and other extraneous suspensions which are subsequently drawn into the electrical apparatus and either coat the electrical components thereof to introduce short circuits or other undesirable electrical characteristics or the electrical components are corroded due to chemicals present in the atmosphere. Accordingly, it is desirable to modify the cooling system configuration in accordance with the environment in which the electrical apparatus is being utilized while still maintaining adequate cooling for the electrical components contained therein.

The problem of providing adequate cooling to the electrical components employed for supplying current to electroplating operations or the like is particularly pronounced due to the high currents generated within such units and the desirability of providing a substantially hermetically sealed enclosure to protect the electrical components thereof from the moist and corrosive atmospheres present in most electrochemical treating processes. Various cooling techniques have heretofore been used or proposed in providing efficient cooling of the components contained within the rectifier enclosure. However, these cooling techniques have not been universally applicable to the various environments in which the rectifying apparatus is being utilized, and has resulted in an increased cost for the rectifier unit and an increased size in accommodating the cooling system. Moreover, current loading and other variable conditions create situations where the increased cooling is not necessarily needed or desired, and in this situation, the auxiliary unit may be disconnected.

In accordance with the principles of the present invention, a cooling system has been provided which is universally applicable to an electrical system in a noncorrosive, noncontaminated atmosphere wherein the cooling requirements for the electrical apparatus are at a low level to a system wherein the atmosphere of the environment is extremely corrosive and contaminated and the cooling requirements are extremely high due to the large quantities of heat being generated within the rectifier enclosure. In accordance with certain other principles of the present invention a hermetically sealed enclosure for electrical apparatus is provided wherein the heat dissipating characteristics of the cooling system provided may be varied in accordance with the amount of heat being generated within the rectifier system thereby enabling the manufacturer to tailor the unit being sold to the particular use or purpose of the user without unnecessarily increasing the cost of the unit.

Accordingly, it is a principal object of the present invention to provide an improved cooling system for an electrical power supply apparatus which overcomes the disadvantages present in certain prior art cooling systems.

Another object of the present invention is to provide an improved cooling system for an electrical power supply apparatus which is convertible from an open system to a hermetically sealed system.

It is still another object of the present invention to provide an improved cooling system for an electrical power supply apparatus which is of simple construction, efficient in operation, compact in size and highly flexible and versatile in its adaptation to the particular environment or use.

Still another object of the present invention is to provide an improved cooling system for electrical power supply apparatus incorporating an add-on type on enclosure which hermetically seals the cabinet for the electrical apparatus while providing additional heat dissipating properties to the cooling system.

It is still a further object of the present invention to provide an improved add-on cooling system for use with an electrical power supply apparatus cooling system wherein the add-on unit utilizes a modular configuration to provide flexibility in the degree of its heat dissipating characteristics.

It is another object of the present invention to provide an improved add-on cooling system for use with an electrical power supply apparatus which provides an extremely efficient air flow configuration therethrough.

It is still another object of the present invention to provide an improved auxiliary cooling system for use with an electrical power supply apparatus which may be readily adapted to existing air-cooled electrical power supply apparatuses.

It is still a further object of the present invention to provide an improved add-on cooling system for use in conjunction with the cooling system of an electrical power supply apparatus wherein the desirable features of a fluid cooling system, incorporating fluid flowing through a series of tubes, may be added to air-cooled electrical power supply apparatus as the need arises.

The foregoing and other objects and advantages of the present invention are achieved by employing, in an electrical apparatus having electrical components mounted therein, a convertible cooling system to provide cooling for the electrical components within the enclosure. In one preferred embodiment the cooling system comprises an enclosure which includes means defining a fluid flow passage through the enclosure and over the electrical components contained therein. The cooling system further includes means for moving cooling fluid through the flow passageway, as for example a blower system, wherein the enclosure includes a fluid intake opening and a fluid exhaust opening for admitting air to the fluid flow passageway and exhausting the air therefrom. The system is rendered convertible by further providing a removable enclosure in fluid communication with the fluid flow passageway for sealing the main enclosure and closing the fluid passageway. The removable enclosure is provided with a heat conductive member for dissipating heat generated within the main system enclosure.

In the particular system disclosed, the removable heat exchanger includes a housing which is removably attached to the electrical apparatus enclosure, the housing including an intake opening and an exhaust opening and further includes means defining a fluid flow passageway between the intake and exhaust openings. Intermediate the intake and exhaust openings, a heat exchanger assembly is supported within the housing and includes a plurality of heat exchanger modules which are removably supported in the housing. The modules are designed to include fluid flow tubes for conducting cooling fluid through the modules and thereby dissipating any heat generated within the electrical apparatus enclosure.

Other objects, features and advantages of the present invention will become apparent from the subsequent description and appended claims while taken in conjunction with the accompanying drawings, in which:

Figures 1, 2, 3:
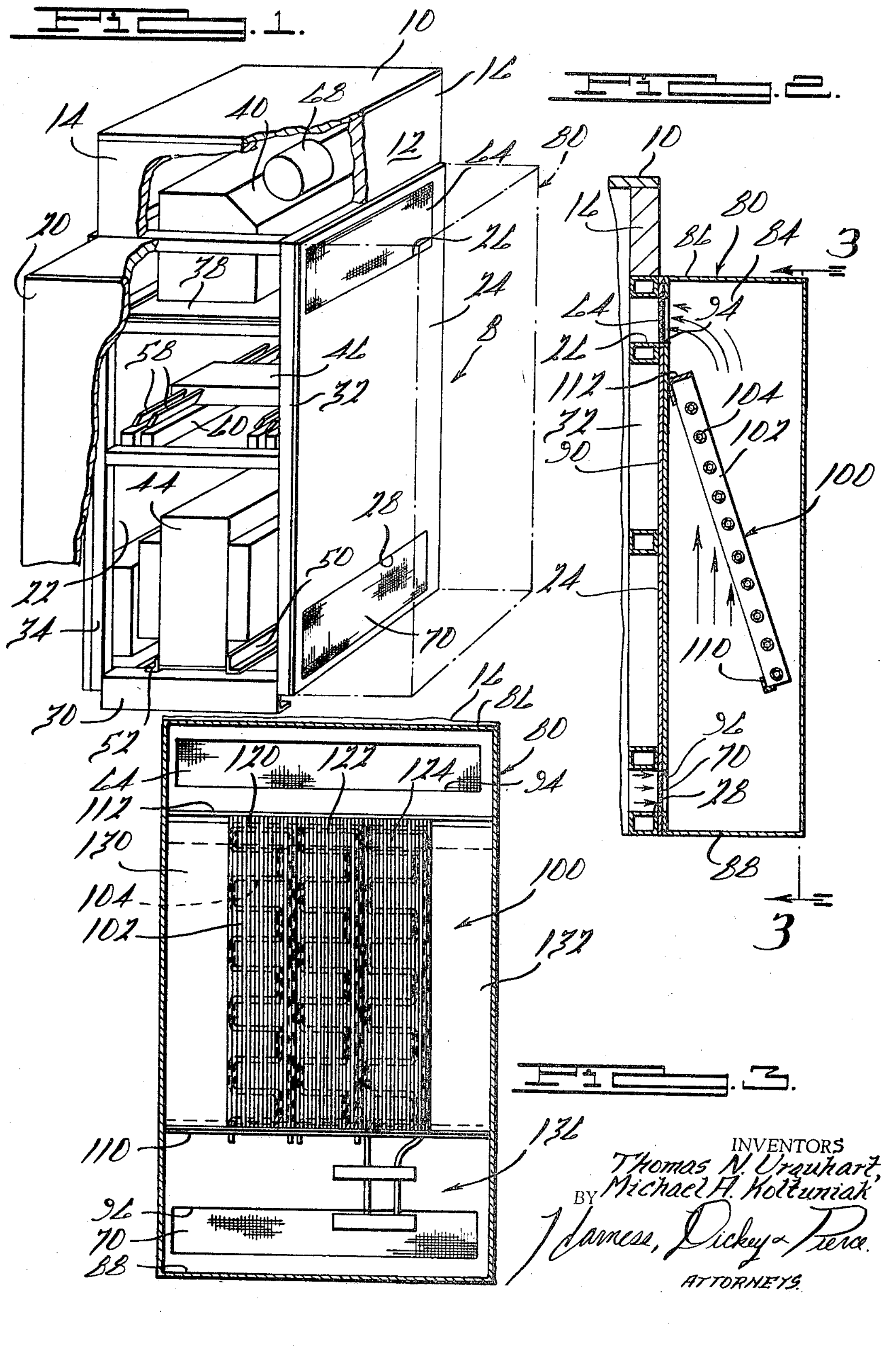
FIGURE 1 is an elevation view in perspective of a typical rectifier apparatus to which the present invention is applicable with front portions of the cabinet removed to expose the interior arrangement of the electrical components and the cooling fluid blower apparatus.
FIGURE 2 is an elevation view in section illustrating features of an add-on unit incorporating certain principles of the present invention.
FIGURE 3 is a sectional view taken along line 3—3 of FIGURE 2 and particularly illustrating the modular feature of the heat exchanger portion of the add-on unit.

Referring now in detail to the drawings and, as may be best seen in FIGURE 1, a typical power supply apparatus, to which the present invention is applicable, comprises a suitable three-dimensional enclosure 8 which may be fabricated of any rigid material, as for example sheet steel or the like. The enclosure 8 is fabricated of a top panel 10 which forms the top closing member for a blower housing 12, the housing 12 being fabricated of a plurality of side members 14, 16. The main portion of the cabinet includes a front panel member 20 which closes the front portion of a control panel (not shown) and a plurality of side members 22, 24, the latter of which are formed with an upper or inlet aperture 26 and a lower or exhaust aperture 28.

The panels 10, 14, 16, 20, 22, 24 may be made removable in order to facilitate the fabrication of the rectifier assembly contained therein and its repair. Suitable channel irons 30 are provided at the lower portion and interconnected with other angle members 32, 34 to rigidify the housing structure. Also, angle iron reinforcing elements may be secured to the individual panels effecting further rigidification thereof as may be desired. The individual panels comprising the enclosure are joined to each other in a manner to minimize leakage of air or other gases into and out of the interior of the enclosure.

The interior of the enclosure is generally divided into two compartments by a transversely extending partition 38 defining an upper or blower compartment and a lower or components housing compartment. The manner of the connections between the several panels comprising the enclosure and the outer panels are such as to provide maximum access to the interior of the enclosure 8. The points of connection of the front and rear panels to the enclosure are preferably provided with a suitable resilient gasketing material in order to maintain substantial air tight integrity of the interior of the enclosure 8, exclusive of the apertures 26 and 28.

The upper compartment is provided with a blower assembly 40 which may be of any conventional design and operates to draw cooling fluid in through the intake aperture 26, through a fluid flow passageway formed by the panel members 22, 24 etc., over the electrical components contained within the enclosure 8, and out through the exhaust aperture 28.

The exemplary power supply apparatus illustrated in the drawings may include a transformer assembly 44 for supplying low voltage, high amperage alternating current energy, which may be rectified for use in a variety of processes including electroplating and anodizing of metallic workpieces. The alternating current from the transformer 44 is rectified through a suitable diode bank 46, or the bank 46 may consist of a plurality of unidirectionally conductive control elements, as are well known in the art. It is to be understood that the electrical element components 44 and 46 are shown for illustrative purposes only and any type of electrical apparatus may be incorporated within the housing 8. Such regulatory controls may take the form of any of the well known types including, inter alia, switches, variable transformers, induction regulators, silicon controlled rectifiers and saturable reactors.

The transformer 44 is mounted on a plurality of angle irons 50, 52 to provide adequate support therefor, and the bank 46 is illustrated as being supported on bus bars 58 which are suitably led to the exterior of the cabinet to provide a connection to the load being supplied. The bus bars 58 may be suitably supported on support members 60, as is well known in the art.

The electrical power supply apparatus, as described above and illustrated in FIGURE 1, is of the type which may be provided in an environment wherein the atmosphere is relatively noncorrosive and not contaminated with foreign material. In accordance with the cooling system illustrated in FIGURE 1, the high rate of heat dissipation of each of the electrical components contained within the cabinet 8 is rapidly removed by a cooling fluid passing through a screen member 64 mounted in the intake aperture 26, the fluid passing through the blower assembly 40, which generally includes a motor 68 to drive the fan member (not shown) thereby forcing the air downwardly through the fluid flow passageway formed by the panels of the cabinet 8. The cooling fluid passes through the electrical components and is forced outwardly through a second screen 70 disposed in the exhaust aperture 28.

As stated above, suitable baffling within the enclosure 8 may be provided to direct the flow of cooling fluid to the most critical heat generating areas, as for example certain portions of the transformer member 44 and the rectifying elements 46. The air being drawn through the fluid flow passage within the cabinet 8 may be derived from the atmosphere within the building housing the cabinet 8, or the inlet or exhaust apertures 26, 28, respectively, may be ducted to the exterior of the building in accordance with the desires of the users. In the event additional cooling or a closed system is desired, the add-on cooling unit incorporating the principles of the present invention may be suitably bolted to the exterior of the cabinet 8 and in contiguous relation with the panel 24 as is illustrated in phantom in FIGURE 1.

Referring now to FIGURES 2 and 3, there is illustrated one preferred representation of an add-on cooling system incorporating the features of the present invention which may be readily adapted to the electrical apparatus illustrated in FIGURE 1. It is to be understood that the invention contemplates various forms of add-on cooling systems, the physical characteristics of which are adapted to the particular electrical apparatus with which it is being utilized. The add-on cooling system generally consists of an enclosure 80 formed by a rear wall panel 82, a side panel 84, a top panel 86 and a bottom panel 88. The remaining side panel is not shown. The enclosure 80 may further include an inner panel 90 which is positioned in contiguous relation with the panel 24 of the main rectifying apparatus or the panel 90 may be omitted and suitable structural strengthening members added to provide additional rigidity for the enclosure 80.

The add-on system is suitably fastened to the enclosure 8 by any known fastening means (not shown). The enclosure 80 is provided with an exhaust aperture 94 positioned in mating relation with the intake aperture 26 of the rectifier apparatus enclosure 8. Similarly an intake aperture 96 is formed in enclosure 80 and positioned in contiguous relation with the exhaust aperture 28 of the rectifying enclosure 8.

Thus a cooling, fluid flow passageway is defined through the enclosure 80 and is directed from the inlet aperture 96 through the interior of the enclosure 80 and out through the exhaust aperture 94. The cooling fluid is adapted to pass through a heat exchanger apparatus 100 which is suitably positioned within the interior of the enclosure 80 and generally midway between the ends of the flow passageway through the enclosure 80. The heat exchanger apparatus generally includes heat absorbing means 102 in the form of fins or the like and a plurality of cooling fluid tubes 104 are passed through the interior of the cooling fins 102 in a serpentine path, as is common in the art. Suitable cooling fluid is adapted to be passed through the tubes to absorb the heat contained within the fins 102 and carry this heat to some external heat radiating apparatus (not shown).

The interior of the enclosure 80 has been provided with suitable mounting brackets, including a lower bracket 110 and an upper bracket 112. The heat exchanger apparatus 100 is mounted within the enclosure 80 such that an angle is formed with the walls of the enclosure 82, 90 to provide additional length for the heat exchanger apparatus while maintaining the desired flow of cooling fluid across the heat exchanger. It is to be understood that this angle may be increased or decreased depending on the amount of cooling which is desired to be achieved within the add-on cooling system.

Referring now to FIGURE 3 there is illustrated one form of an apparatus which may be utilized to vary the degree of heat dissipation available to supplement the cooling effect of air passing over the electrical components. In the illustration of FIGURE 3, the heat dissipating apparatus 100 has been modularized wherein three heat dissipating modules 120, 122 and 124 have been placed in position in direct contact with the cooling fluid flowing thereacross. Suitable baffle means 130, 132 have been inserted in the positions where heat dissipating modules have not been provided and it is to be understood that the apparatus illustrated in FIGURE 3 may be expanded to include five heat dissipating modules or may be contracted to include as little as one module.

This modification is accomplished by merely adding or subtracting heat dissipating modules and adding blank panels, such as panels 130, 132, where the heat dissipating modules have been removed. A suitable connection 136 to a source of water or other heat carrying fluid is provided wherein the heat dissipating modules may be connected to an external source of cooling fluid under pressure. Fluid connections between the various modules and the coupling assembly 136 are provided as is well known in the art.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In combination with an electrical apparatus including heat generating electrical components, a convertible cooling system for dissipating the heat generated by the electrical components in an open or closed cooling system configuration comprising a main enclosure, main cooling apparatus supported within said enclosure and operative to cool the electrical components including means defining a gas flow passageway through said main enclosure and the electrical components, blower means for moving a gas through said flow passageway and over at least a portion of said cooling apparatus, said main enclosure having a first opening defining a gas intake opening for providing a supply of cooling gas to said main enclosure and a second opening defining a gas exhaust opening for exhausting said cooling gas, and auxiliary cooling apparatus supported exteriorly to said main enclosure for lowering the temperature of the cooling gas prior to the entry of the cooling gas into the main enclosure including removable enclosure means in fluid communication with said gas flow passageway for sealing said main enclosure and closing said gas flow passageway, heat conductive means for dissipating heat generated with said main enclosure to the exterior of said main enclosure and said enclosure means, and means in fluid communication with said intake and exhaust openings for communicating said enclosure and said removable enclosure means.

2. The cooling system of claim 1 further including means for removably attaching said enclosure means to said enclosure wherein said removable enclosure means is mounted in contiguous relation to said enclosure.

3. The cooling system of claim 1 wherein said removable enclosure means further includes at least one heat exchanger module mounted therein, said heat exchanger module including heat absorbing means having fluid tubes for conducting heat from the interior to the exterior of said removable enclosure means.

4. The cooling system of claim 3 wherein said heat exchanger module is of greater dimension than the transverse dimension of said removable enclosure means and is mounted within said enclosure means at an angle relative thereto for increasing the heat absorbing characteristics thereof.

5. The cooling system of claim 1 further including a plurality of heat exchanger modules removably mounted in said removable enclosure means and removable blank baffle means substantially blocking the difference in transverse dimension between the dimension occupied by said heat exchanger modules and the total transverse dimension of said removable heat exchanger.

6. The removable heat exchanger of claim 1 further including a plurality of heat exchanger modules mounted within said removable enclosure means, and means for connecting said modules, one to the other, and to a source of cooling fluid external to said removable enclosure means.

7. The removable heat exchanger of claim 6 wherein said heat exchanger module is of greater dimension than the transverse dimension of said removable enclosure means and is mounted within said enclosure means at an angle relative thereto for increasing the heat absorbing characteristics thereof.

8. The removable heat exchanger of claim 1 further including a plurality of heat exchanger modules removably mounted in said removable enclosure means and removable blank baffle means substantially blocking the difference in transverse dimension between the dimension occupied by said heat exchanger modules and the total transverse dimension of said removable heat exchanger.

References Cited

UNITED STATES PATENTS

| | | | |
|---|---|---|---|
| 1,626,400 | 4/1927 | Frank | 165—137 |
| 2,147,283 | 2/1939 | Covell | 165—96 X |
| 2,938,712 | 5/1960 | Pellmyr | 165—137 |

| | | | |
|---|---|---|---|
| 2,412,989 | 12/1946 | Kotterman | 317—234 X |
| 2,538,382 | 1/1951 | Reilly | 62—419 X |
| 2,744,393 | 5/1956 | Brugler et al. | 165—76 X |
| 2,914,927 | 12/1959 | Corhanidis | 62—448 X |

FOREIGN PATENTS

| | | |
|---|---|---|
| 886,160 | 6/1943 | France. |
| 659,391 | 10/1951 | Great Britain. |

ROBERT A. O'LEARY, *Primary Examiner.*

A. W. DAVIS, *Assistant Examiner.*